(12) United States Patent
Takahashi (10) Patent No.: US 11,100,660 B2
(45) Date of Patent: Aug. 24, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yoichi Takahashi, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 196 days.

(21) Appl. No.: 16/290,652

(22) Filed: Mar. 1, 2019

(65) Prior Publication Data

US 2019/0279378 A1    Sep. 12, 2019

(30) Foreign Application Priority Data

Mar. 6, 2018 (JP) .............................. JP2018-039539

(51) Int. Cl.
   *G06K 9/00* (2006.01)
   *G06T 7/38* (2017.01)
   *G06T 7/33* (2017.01)
   *G06T 7/246* (2017.01)

(52) U.S. Cl.
   CPC ................ *G06T 7/38* (2017.01); *G06T 7/248* (2017.01); *G06T 7/337* (2017.01); *G06T 2207/10024* (2013.01); *G06T 2207/10032* (2013.01); *G06T 2207/20221* (2013.01); *G06T 2207/30241* (2013.01)

(58) Field of Classification Search
   CPC ......... G06T 7/0069; G06T 7/07; G06T 7/579; G06T 7/50; G06T 5/005; G06T 5/50; G06T 7/20; G06T 7/38; G06T 7/337; G06T 7/248; H04N 13/117; H04N 19/553; H04N 13/00; H04N 19/00
   See application file for complete search history.

(56) References Cited

U.S. PATENT DOCUMENTS

| | | | |
|---|---|---|---|
| 6,453,069 B1 * | 9/2002 | Matsugu | G06K 9/48 382/173 |
| 2004/0062439 A1 * | 4/2004 | Cahill | H04N 5/272 382/173 |
| 2017/0269187 A1 * | 9/2017 | Ikeda | G06T 7/248 |

FOREIGN PATENT DOCUMENTS

JP          2004-147155 A        5/2004

* cited by examiner

*Primary Examiner* — Duy M Dang
(74) *Attorney, Agent, or Firm* — Canon U.S.A., Inc. IP Division (57) ABSTRACT

An apparatus includes at least one processor configured to function as following units including a first difference extraction unit configured to extract a first difference between a plurality of images, an alignment unit configured to correct a position of an image with reference to a predetermined subject within the plurality of images, a second difference extraction unit configured to extract a second difference between the plurality of images after the position of the image is corrected by the alignment unit, and a detection unit configured to detect a moving object area based on the extracted first difference and the extracted second difference.

20 Claims, 5 Drawing Sheets

FIRST IMAGE

SECOND IMAGE

FIG.4

IMAGE PROCESSING APPARATUS, IMAGE PROCESSING METHOD, AND STORAGE MEDIUM

BACKGROUND OF THE INVENTION

Field of the Invention

The aspect of the embodiments relates to an image processing apparatus, an image processing method, and a storage medium for detecting a moving object area using a plurality of images.

Description of the Related Art

Conventionally, a technique for capturing an image of a trajectory of celestial bodies in a diurnal motion by performing a long exposure is known. However, a long exposure may brighten the entire image depending on an exposure time. There is also a technique for synthesizing an image of a trajectory of celestial bodies by capturing a plurality of images for a predetermined period of time, and by selecting bright portions of the plurality of images. In such an image capturing technique, if a bright subject such as a headlight of a vehicle or an airplane enters an angle of view, the subject other than the trajectory of celestial bodies is also synthesized. Consequently, an image desired by a photographer cannot be acquired.

To deal with above described situation, a technique for leaving only a trajectory of celestial bodies in an image is provided. In the technique, in a case where a moving object area such as an airplane is detected, images excluding the detected moving object area are synthesized. Japanese Patent Application Laid-Open No. 2004-147155 discusses a method for detecting a moving object area. In the method, image capturing is performed in a certain short time in which a celestial object stays still, and a brightness difference between captured images on a pixel basis is extracted so as to detect the moving object area.

In above described method, since images are sequentially captured for a long period of time to capture a trajectory of celestial bodies, detecting brightness differences is not enough to capture the desired image. That is, the celestial bodies moving in a diurnal motion may also be detected as moving object areas.

SUMMARY OF THE INVENTION

According to an aspect of the embodiments, an apparatus includes at least one processor and/or circuit configured to function as following units including a first difference extraction unit configured to extract a first difference between a plurality of images, an alignment unit configured to correct a position of an image with reference to a predetermined subject within the plurality of images, a second difference extraction unit configured to extract a second difference between the plurality of images after the position of the image is corrected by the alignment unit, and a detection unit configured to detect a moving object area based on the extracted first difference and the extracted second difference.

Further, features of the disclosure will become apparent from the following description of exemplary embodiments with reference to the attached drawings.

DESCRIPTION OF THE EMBODIMENTS

Hereinafter, an exemplary embodiment is described with reference to the drawings.

Figure 1:
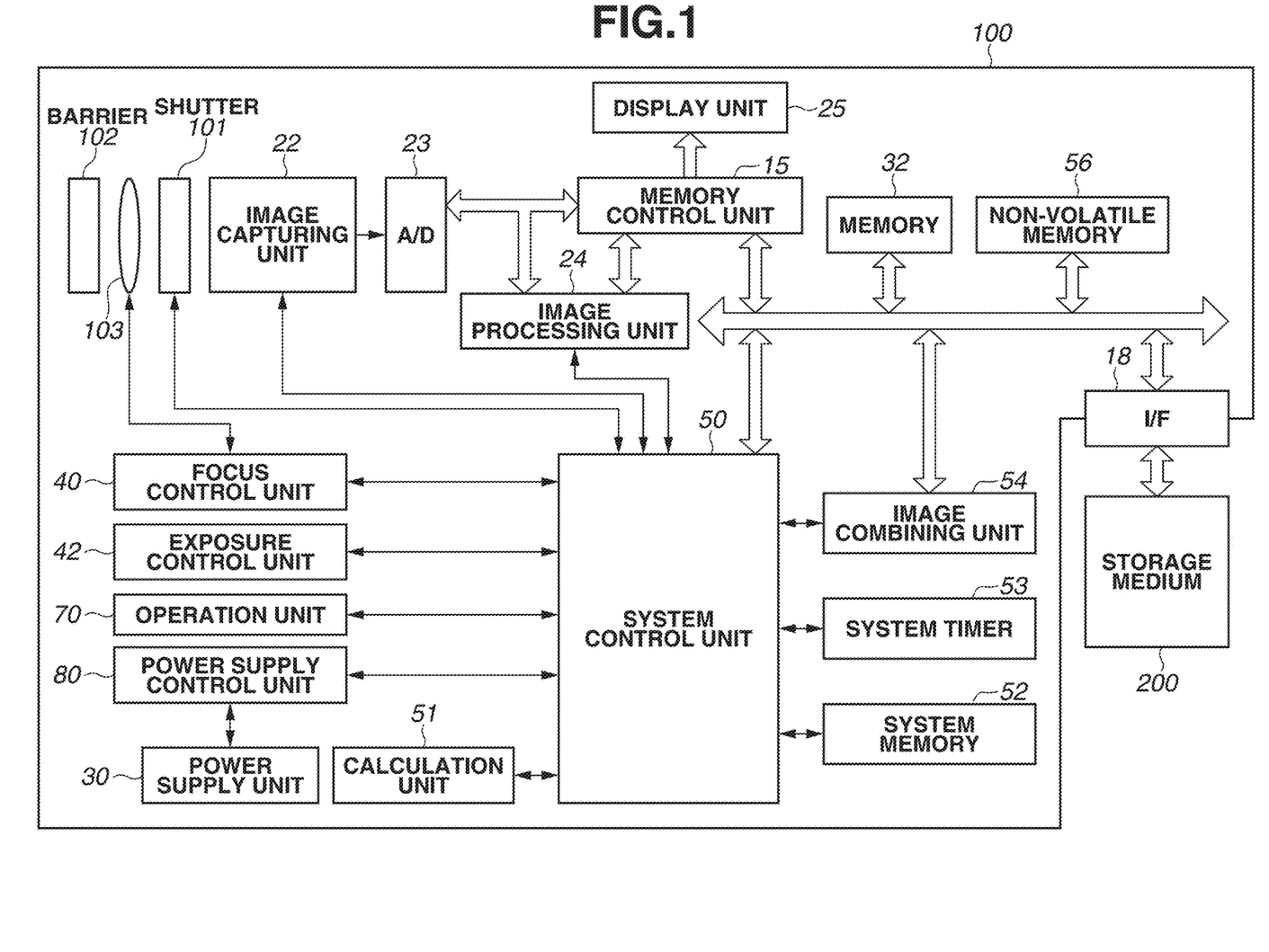
FIG. 1 is a block diagram illustrating an example of an internal configuration of an image processing apparatus according to an exemplary embodiment.

FIG. 1 is a block diagram illustrating an example of an internal configuration of an image processing apparatus 100 according to the exemplary embodiment. In FIG. 1, the image processing apparatus 100 is, for example, an image capturing apparatus such as a digital camera.

A shutter 101 is a mechanical shutter having an aperture function. An image capturing unit 22 includes an image capturing element for converting an optical image into electrical signals. An analog-to-digital (A/D) converter 23 converts an analog signal to be output from the image capturing unit 22 into a digital signal. In the present embodiment, the image capturing element of the image capturing unit 22 includes color filters of red (R), green 1 (G1), green 2 (G2), and blue (B), and is configured with a Bayer array in which the color filters of respective colors are regularly arranged. However, the image capturing element of the image capturing unit 22 is not limited thereto. The image capturing unit 22, an image capturing lens 103, and a shutter 101 are controlled by a system control unit 50 using a timing generation circuit (not illustrated). The image processing apparatus 100 according to the present exemplary embodiment can control an accumulation time as an electronic shutter without using the shutter 101 by controlling a reset timing of the image capturing element. The image processing apparatus 100 can also be used for moving image capturing.

An image processing unit 24 performs processing on data from the A/D converter 23 or data from a memory control unit 15. The processing includes various correction processing such as predetermined pixel interpolation processing and shading correction, white balance (WB) processing, γ correction processing, and color conversion processing. Moreover, the image processing unit 24 crops an image and performs zooming processing on the cropped image, thereby providing an electronic zoom function.

The shading correction processing corrects a brightness level within an image frame in such a manner that shading caused by a characteristic of the image capturing lens 103 or a characteristic such as aberration of the image capturing unit 22 is corrected with respect to data from the A/D converter 23 or data from the memory control unit 15. In the WB processing, automatic white balance (AWB) processing for adjusting a white reference within an image frame to white color is performed with respect to image data after the shading correction processing. In the present exemplary embodiment, the shading correction processing makes a correction by applying a gain to each pixel according to two-dimensional coordinates (a position) of the image capturing element of the image capturing unit 22. The WB processing applies different gains to each pixel of R, G1, G2, and B of the Bayer array. The image processing unit 24 further includes a function of developing image data from a RAW image on a Bayer basis to an image in a luminance, blue-luminance, and red-luminance (YUV) format that is a general-purpose image format. The image processing unit 24 also includes a function of encoding or decoding an image from or into a format such as a Joint Photographic Experts Group (JPEG) format. Moreover, the image processing unit 24 includes a function of calculating a motion vector from a plurality of images (described below).

An image combining unit 54 includes a combining processing circuit that combines a plurality of pieces of image data. In the present exemplary embodiment, in addition to simple additive synthesis or averaging synthesis, the image combining unit 54 selects an image having the brightest value or the darkest value in each pixel or each area of combining target image data, and combines the selected images to generate image data of one image. A method by which brightest images are selected and combined is called "comparative brightness combining method", whereas a method by which darkest images are selected and combined is called "comparative darkness combining method". The image combining unit 54 can be integrated with the image processing unit 24.

The memory control unit 15 controls the A/D converter 23, the image processing unit 24, and a memory 32. Data from the A/D converter 23 is written into the memory 32 either via the image processing unit 24 and the memory control unit 15, or directly via the memory control unit 15.

A display unit 25 includes a thin-film transistor (TFT) liquid crystal display. Display image data written in the memory 32 is displayed by the display unit 25 via the memory control unit 15. The display unit 25 can acquire image data of images sequentially captured by exposure and repeated reading in a predetermined period by the image capturing unit 22, and display the acquired image data via the image processing unit 24 and the memory control unit 15. In such a case, the use of the display unit 25 can provide a live view display and an electronic viewfinder function. Moreover, the display unit 25 can optionally turn on and off a display based on an instruction from the system control unit 50. If a display is turned off, power consumption of the image processing apparatus 100 can be markedly reduced.

The memory 32 stores data such as still image data and moving image data, and has a storage capacity that is enough to store data of a predetermined number of still images and data of a predetermined time of moving image. Thus, even if continuous image capturing in which a plurality of still images is continuously captured is performed, a large number of images can be written in the memory 32 at high speed. Moreover, the memory 32 can be used as a workspace of the system control unit 50.

The system control unit 50 controls the whole of the image processing apparatus 100. The system control unit 50 executes a program stored in a non-volatile memory 56 (described below) to perform each processing of the present exemplary embodiment. A system memory 52 is, for example, a random access memory (RAM). In the system memory 52, a constant and a variable for the system control unit 50 to operate, and a program read from the non-volatile memory 56 are loaded. The system control unit 50 also performs display control by controlling the memory 32 and the display unit 25. The image processing unit 24 performs predetermined calculation processing by using captured image data. The system control unit 50 controls an exposure control unit 42 and a focus control unit 40 based on a calculation result acquired by the predetermined calculation processing. That is, the system control unit 50 controls automatic focus (AF) processing and automatic exposure (AE) processing using a through-the-lens (TTL) method.

A system timer 53 is a clocking unit that measures a time for various control and a time of an installed clock. The non-volatile memory 56 is a memory including a flash read only memory (flash ROM). A program code to be executed by the system control unit 50 is written in the non-volatile memory 56, and the system control unit 50 executes the program code while sequentially reading the program code. The non-volatile memory 56 has an area in which system information is stored, and an area in which user setting information is stored, so that various information and settings are read and restored at the next start up.

An operation unit 70 includes a touch panel and various buttons such as a shutter button, a menu button, a set button, a macro button, a flash light setting button, and a single/continuous/self-timer image capturing switching button. The operation unit 70 further includes a menu selection + (plus) button, a menu selection − (minus) button, an image quality selection button, an exposure compensation button, and a date/time setting button. While the shutter button of the operation unit 70 is operated, a shutter switch SW1 is turned on. This switching gives an instruction to begin processing such as AF processing, AE processing, and AWB processing. After the operation on the operation unit 70 is completed, a shutter switch SW2 is turned on. This switching gives an instruction to begin a series of processing such as exposure processing, development processing, compression/decompression processing, and recording processing.

A power supply unit 30 includes, for example, a primary battery such as an alkaline battery and a lithium (Li) battery, a secondary battery such as a nickel cadmium (NiCd) battery, a nickel metal hydride (NiMH) battery, and a Li battery, and an alternating current (AC) adapter. A power supply control unit 80 controls the power supply unit 30. A connector 18 is an interface to connect to a storage medium 200 such as a memory card and a hard disk. A barrier 102 covers the image capturing lens 103 and the image capturing unit 22 of the image processing apparatus 100 to prevent the image capturing unit 22 from being soiled or damaged.

In the present exemplary embodiment, the image processing unit 24 first performs alignment processing based on a plurality of images. In difference extraction processing, the image processing unit 24 evaluates brightness information, color information, or both of brightness information and color information with respect to each pixel of input images, and calculates a difference absolute value. Herein, the difference extraction processing is performed in both cases where the alignment processing is performed and where the alignment processing is not performed.

Figure 2:
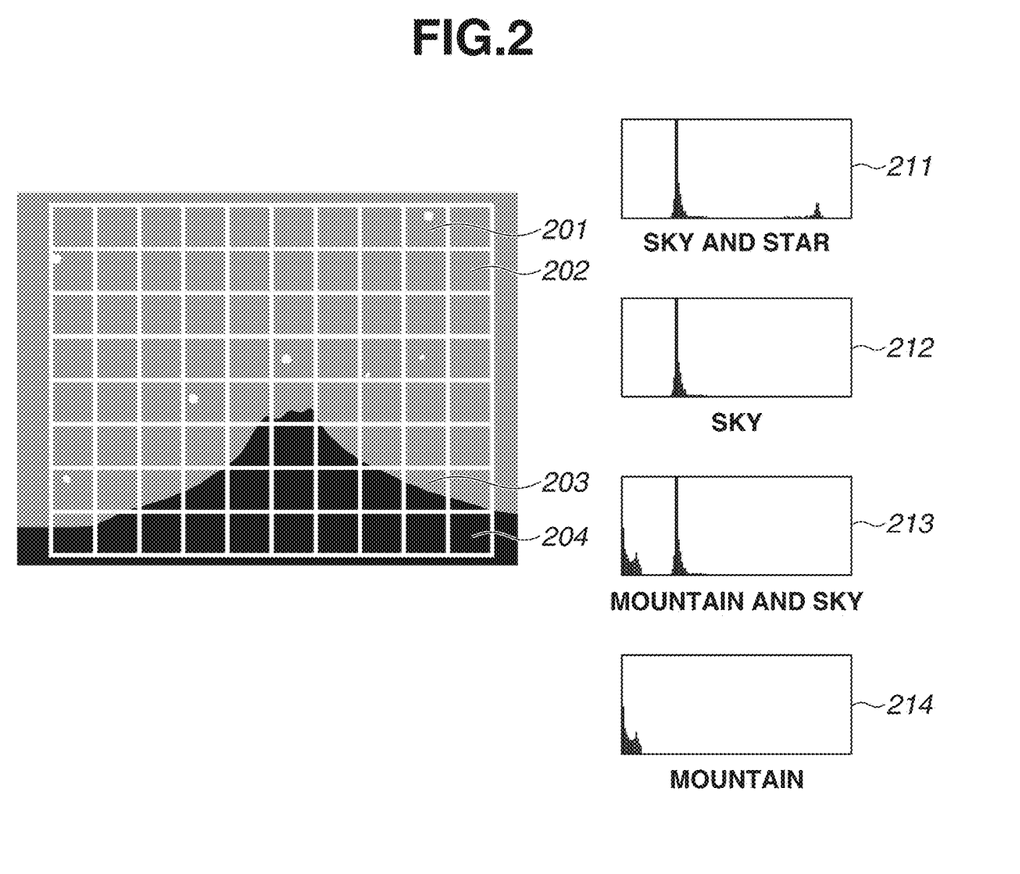
FIG. 2 is a diagram illustrating histograms for a plurality of respective blocks.
Figure 3:
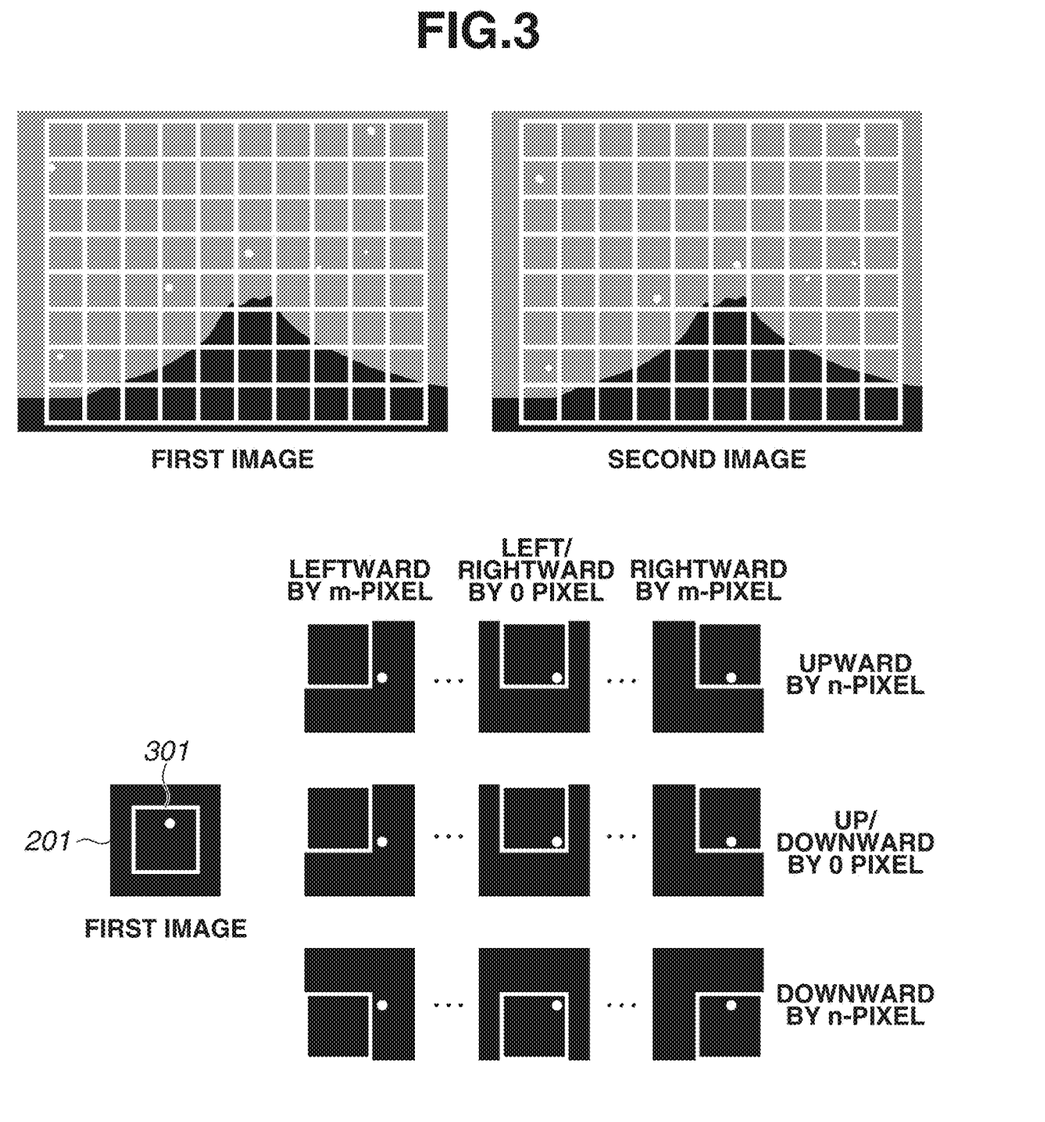
FIG. 3 is a diagram illustrating a procedure for calculating a motion vector.

The alignment processing is described with reference to FIGS. 2 and 3. In the present exemplary embodiment, the image processing unit 24 divides one image into a plurality of blocks as illustrated in FIG. 2. Although, in the example illustrated in FIG. 2, the image is divided into blocks of 10×8, a block size can be changed depending on the number of pixels in an image, and thus the number of blocks is not limited to the example illustrated in FIG. 2. For example, in one embodiment, in a case where the image capturing lens 103 has a short focal length (i.e., a wide-angle lens), a block size is small since stars tend to be captured in a small size. Although, block shapes are square in the example illustrated in FIG. 2, another shape such as rectangular shape may also be applicable. Moreover, by calculating a difference value between images and allocating a block in an area having the difference value, efficient block arrangement considering a star area may be used.

The image processing unit 24 creates a luminance histogram of each block. For example, in FIG. 2, as for a block 204 in a dark portion such as a part of a mountain, the image processing unit 24 creates a histogram 214 with one peak corresponding to the dark portion. As for a block 203 including sky and a part of the mountain, the image processing unit 24 creates a histogram 213 with two peaks corresponding to a dark portion and a lighter portion. As for a block 202 including only sky without stars, the image processing unit 24 similarly creates a histogram 212 with one peak. As for a block 201 including a celestial object, the image processing unit 24 creates a histogram 211 with one peak corresponding to a sky portion and a small peak corresponding to a portion lighter than the sky portion. The image processing unit 24 can identify a block that includes a celestial object (a star in the present exemplary embodiment) based on luminance distributions of the histograms 211 through 214.

Processing for calculating a motion vector is described with reference to FIG. 3. Herein, the description is given using an example case in which stars have overall moved in a lower right direction of an image in a period between image capturing of a first image and a second image. For example, the image processing unit 24 sets a sub-block 301 within the block 201 including the star illustrated in FIG. 2. Such a sub-block 301 is considered as a template. The image processing unit 24 acquires a difference value by scanning the sub-block 301 on a pixel basis within the same block in the second image. In an example illustrated in FIG. 3, a scanning result indicates that a difference value is smallest, that is, shows a high similarity when the sub-block 301 is shifted rightward by m-pixel and downward by n-pixel. This indicates that the celestial object has moved rightward by m-pixel and downward by n-pixel. The image processing unit 24 performs the processing on all blocks that include stars detected in FIG. 2. Moreover, in a block in which a motion vector of the celestial object is not detected, a motion vector calculated at a nearby block is used to interpolate the motion vector in the block.

Since a difference value is determined by shifting a sub-block on a pixel basis, such processing is time consuming. Thus, the image processing unit 24 may perform similar processing on a reduced image to calculate a rough motion vector, and then determines a difference value using an unreduced image based on information about the calculated rough motion vector. The image processing unit 24 calculates an affine transformation coefficient from a motion vector for each block, and performs an affine transformation using the calculated affine transformation coefficient, thereby correcting alignment. Transformation is not limited to the affine transformation and geometric deformation of a general image such as projective transformation can be used.

Figure 4:
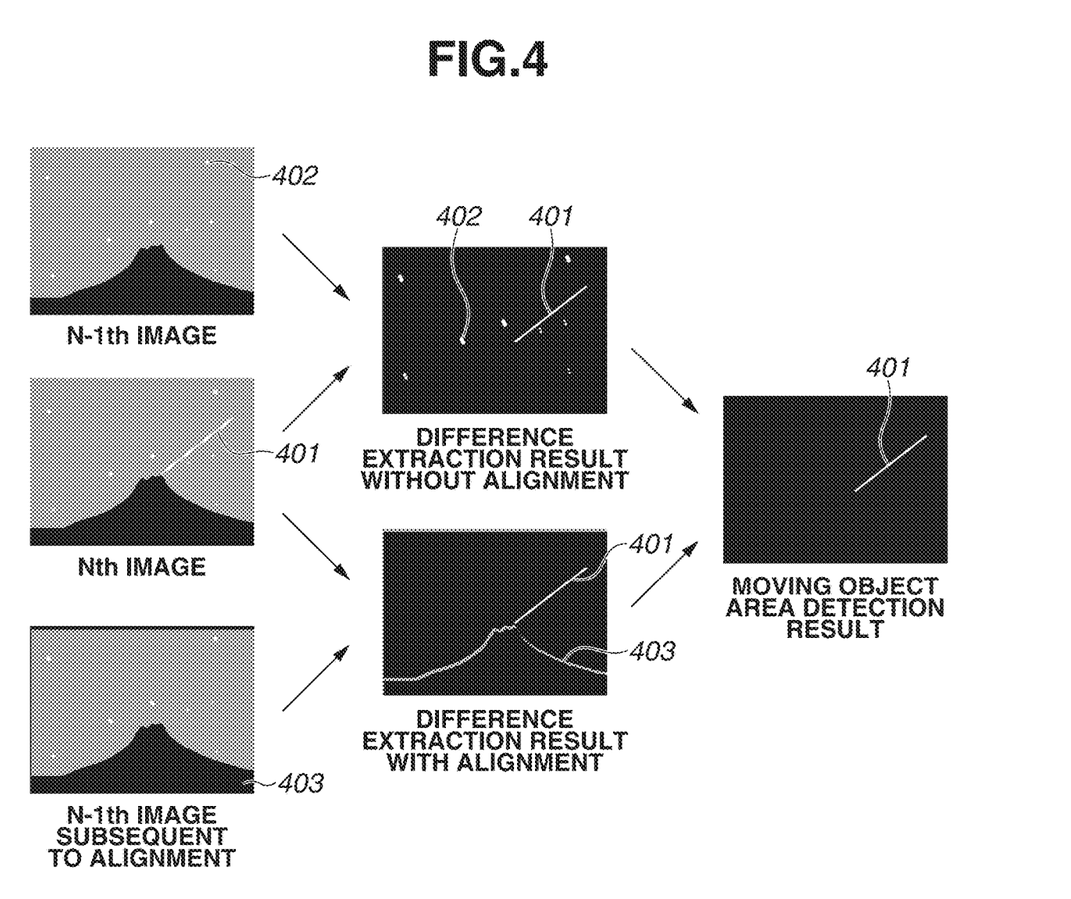
FIG. 4 is a diagram illustrating a procedure for detecting a moving object area.

Subsequently, the image processing unit 24 acquires a difference extraction result acquired by extraction of differences without alignment processing based on an Nth image and an N−1th image, and a difference extraction result acquired by extraction of differences subsequent to alignment processing based on an Nth image and an N−1th image. The image processing unit 24 detects areas that are present in common as differences in both of the difference extraction results as a moving object area. As illustrated in FIG. 4, if differences are extracted without alignment, both of a moving object area 401 (e.g., an airplane track) and a star 402 are extracted as differences. This is because both of the airplane and the star has moved during a period in which the N−1th image and the Nth image are captured. On the other hand, if differences are extracted subsequent to alignment processing, the moving object area 401 and a foreground area 403 area are extracted as differences. Since the airplane moves differently from the star, the moving object area 401 is extracted as a difference. Since alignment processing has been performed on the foreground area 403 corresponding to movement of the stars, an edge of the mountain standing still is extracted as a difference. Since movement of the star 402 is cancelled by the alignment, the movement of the star 402 is not extracted as a difference. Accordingly, the moving object area 401, which is present in both of the difference extraction results, can be detected.

Figure 5:
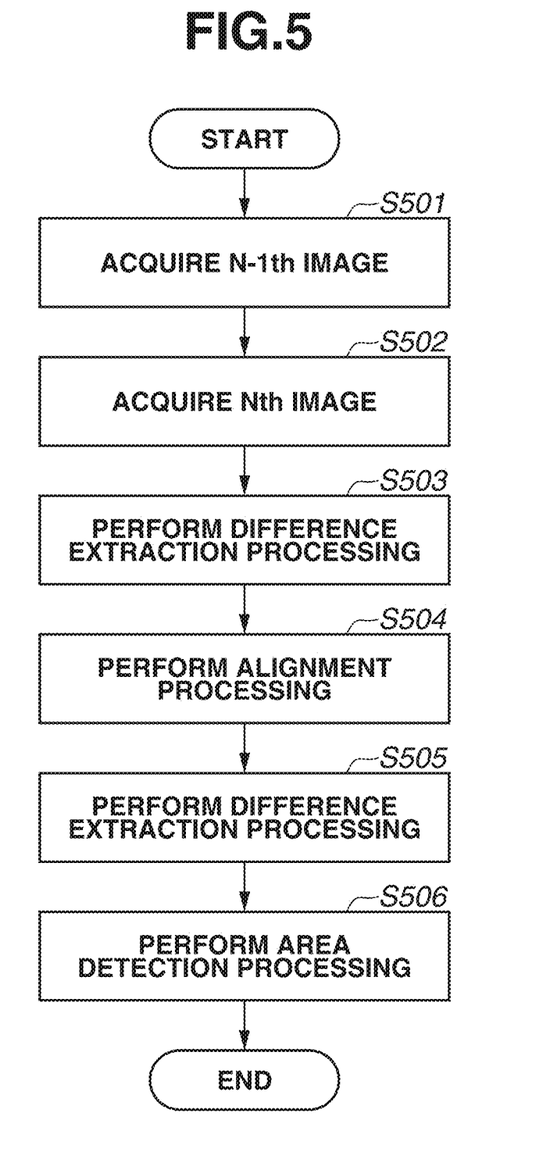
FIG. 5 is a flowchart illustrating one example of a procedure for detecting a moving object area.

FIG. 5 is a flowchart illustrating one example of a procedure for detecting a moving object area.

In step S501, the system control unit 50 acquires a first image according to the above-described procedure. In step S502, the system control unit 50 acquires a second image in a similar manner. Herein, in one embodiment, images to be acquired are two images that are temporally adjacent to each other in terms of image capturing time out of continuously captured images so that a moving object is detected more accurately. For example, in step S501, the system control unit 50 acquires an N−1th image that is relatively past. Then, in step S502, the system control unit 50 acquires an Nth image that is relatively new. The system control unit 50 sets the Nth image as a moving object detection target. An example of an exceptional case includes a case where the moving object detection target is a first image and a second image. In this case, the moving object detection target is the first image as an N−1th image.

In step S503, the image processing unit 24 extracts differences from the N−1th image and the Nth image, and holds the differences as a difference extraction result without alignment in the memory 32. In step S504, the image processing unit 24 performs alignment processing based on the N−1th image and the Nth image. Herein, a moving object detection target is set as a reference image for the alignment. Since the Nth image is set as the reference image, a position of the N−1th image is corrected to move to a position of the Nth image such that positions of the stars match each other. In step S505, the image processing unit 24 extracts differences between the N−1th image and the Nth image subsequent to the alignment processing, and holds the differences as a difference extraction result with alignment in the memory 32.

In step S506, the image processing unit 24 compares the difference extraction result without alignment acquired in step S503 and the difference extraction result with alignment acquired in step S505 on a pixel basis, and detects areas in which differences are extracted in both of the difference extraction results as a moving object area. Herein, a degree of difference to detect areas as a moving object area is retained as a threshold value. In the present exemplary embodiment, difference extraction with alignment is performed after difference extraction without alignment. However, difference extraction with alignment can be performed before difference extraction without alignment.

According to the present exemplary embodiment as described above, an area common to a result acquired by extraction of a difference without alignment processing and a result acquired by extraction of a difference with alignment processing is detected as a moving object area. Accordingly, a subject such as a celestial object not intended to be detected as a moving object can be excluded, and thus a moving object area can be detected with good accuracy.

After the moving object area is detected by the above method, the image combining unit 54 combines a plurality of images that are present prior to alignment to generate combined image data of one image. Herein, the image combining unit 54 performs processing different from normal combining processing on the detected moving object area. For example, if additive synthesis or averaging synthesis is used, it is conceivable that a moving object area is not considered as an addition target, or a brightness value of a moving object area is replaced with a brightness value of a peripheral area and then combining is performed. Moreover, if comparative brightness combining method or comparative darkness combining method is used, it is conceivable that a moving object area is not selected at all times, or a brightness value of a moving object area is replaced with a brightness value of a peripheral area and then combining is performed.

Accordingly, a combined image excluding a subject such as a celestial object not intended to be detected as a moving object can be generated.

The exemplary embodiment has been described. However, the exemplary embodiment is not limited thereto, and various modifications and changes can be made within the scope of the present disclosure. Particularly, the exemplary embodiment can be executed by an image processing apparatus that does not include an image capturing sensor or an optical lens, and detects a motion vector by reading a captured image recorded in a medium such as a storage medium.

An application of the present disclosure is not limited to celestial image capturing. For example, the present disclosure can be applied to a system that captures a plurality of images of a subject that regularly or irregularly moves, and then identifies a trajectory of the subject.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-039539, filed Mar. 6, 2018, which is hereby incorporated by reference herein in its entirety.

What is claimed is:

1. An apparatus comprising:
    at least one processor configured to function as following units:
        a first difference extraction unit configured to extract a first difference between a plurality of images;
        an alignment unit configured to correct a position of an image with reference to a predetermined subject within the plurality of images;
        a second difference extraction unit configured to extract a second difference between the plurality of images after the position of the image is corrected by the alignment unit; and
        a detection unit configured to detect a moving object area based on the extracted first difference and the extracted second difference.

2. The apparatus according to claim 1, wherein the detection unit detects a portion that is common to the first difference and the second difference as the moving object area.

3. The apparatus according to claim 1, wherein the plurality of images are two images temporally adjacent to each other in terms of image capturing time.

4. The apparatus according to claim 3, wherein the alignment unit uses either of the two images as a reference to align a temporally adjacent image.

5. The apparatus according to claim 1, wherein the alignment unit calculates a motion vector of the predetermined subject to perform alignment.

6. The apparatus according to claim 1, wherein the first difference extraction unit and the second difference extraction unit evaluate at least one of color and brightness.

7. The apparatus according to claim 1, wherein the predetermined subject is a star.

8. The apparatus according to claim 1, further comprising a combining unit configured to combine the plurality of images using the detected moving object area to generate a combined image.

9. A method comprising:
    extracting a first difference between a plurality of images;
    aligning by correcting a position of an image with reference to a predetermined subject within the plurality of images;
    extracting a second difference between the plurality of images after the position of the image is corrected in the aligning; and
    detecting a moving object area based on the extracted first difference and the extracted second difference.

10. The method according to claim 9, wherein the detecting detects a portion that is common to the first difference and the second difference as the moving object area.

11. The method according to claim 9, wherein the plurality of images are two images temporally adjacent to each other in terms of image capturing time.

12. The method according to claim 9, wherein the aligning includes calculating a motion vector of the predetermined subject to perform alignment.

13. The method according to claim 9, wherein the first difference and the second difference evaluate at least one of color and brightness.

14. The method according to claim 9, further comprising combining the plurality of images using the detected moving object area to generate a combined image.

15. A non-transitory computer-readable storage medium storing a program for causing a computer to execute following steps comprising:
- extracting a first difference between a plurality of images;
- aligning by correcting a position of an image with reference to a predetermined subject within the plurality of images;
- extracting a second difference between the plurality of images after the position of the image is corrected in the aligning; and
- detecting a moving object area based on the extracted first difference and the extracted second difference.

16. The non-transitory computer-readable storage medium according to claim 15, wherein the detecting detects a portion that is common to the first difference and the second difference as the moving object area.

17. The non-transitory computer-readable storage medium according to claim 15, wherein the plurality of images are two images temporally adjacent to each other in terms of image capturing time.

18. The non-transitory computer-readable storage medium according to claim 15, wherein the aligning includes calculating a motion vector of the predetermined subject to perform alignment.

19. The non-transitory computer-readable storage medium according to claim 15, wherein the first difference and the second difference evaluate at least one of color and brightness.

20. The non-transitory computer-readable storage medium according to claim 15, further comprising combining the plurality of images using the detected moving object area to generate a combined image.

* * * * *